(12) United States Patent
Iyer et al.

(10) Patent No.: US 9,229,897 B2
(45) Date of Patent: Jan. 5, 2016

(54) EMBEDDED CONTROL CHANNEL FOR HIGH SPEED SERIAL INTERCONNECT

(75) Inventors: Venkatraman Iyer, Austin, TX (US); Debendra Das Sharma, Saratoga, CA (US); Robert G. Blankenship, Tacoma, WA (US); Darren S. Jue, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 582 days.

(21) Appl. No.: 13/537,837

(22) Filed: Jun. 29, 2012

(65) Prior Publication Data
US 2014/0006677 A1    Jan. 2, 2014

(51) Int. Cl.
*G06F 13/40*    (2006.01)
*G06F 13/42*    (2006.01)

(52) U.S. Cl.
CPC ................................. *G06F 13/4291* (2013.01)

(58) Field of Classification Search
CPC .................................................. G06F 13/4291
USPC ........................................................ 710/316
See application file for complete search history.

(56) References Cited

U.S. PATENT DOCUMENTS

| 6,005,875 | A  | * | 12/1999 | Lechner   | H04Q 11/0428 370/524 |
| 6,345,072 | B1 | * | 2/2002  | Liu       | H04M 11/062 370/501  |
| 6,845,461 | B1 | * | 1/2005  | Kim       | 713/500              |
| 8,059,673 | B2 | * | 11/2011 | Kobayashi | 370/431              |
| 2004/0156317 | A1 | * | 8/2004  | Lund      | 370/235              |
| 2006/0153155 | A1 | * | 7/2006  | Jacobsen  | H04L 1/1829 370/338  |
| 2007/0124439 | A1 | * | 5/2007  | Shah      | G06F 9/54 709/223    |
| 2011/0032947 | A1 | * | 2/2011  | Brueggen  | 370/412              |
| 2012/0185663 | A1 | * | 7/2012  | Yokoya et al. | 711/167          |

* cited by examiner

*Primary Examiner* — Nimesh G Patel
(74) *Attorney, Agent, or Firm* — Law Office of R. Alan Burnett, P.S.

(57) ABSTRACT

Methods and apparatus for embedding a control channel in a high speed serial interconnect having multiple data lanes. Operational aspects of the interconnect are controlled via use of control channel data that is sent over one or more of the data lanes on a periodic basis. A link state cycle is employed that includes a link control period during which control information is transferred over the interconnect and a link control interval between link control periods during which other links states are implemented, such as for transferring data or operating the link in a low power state. The link state cycles at transmitter and receiver ports are synchronized to account for link transmit latencies, and the timing of link state cycles corresponding to a bidirectional exchange of link control information may be configured to support an overlapping implementation or to facilitate a request/response link control protocol.

31 Claims, 13 Drawing Sheets

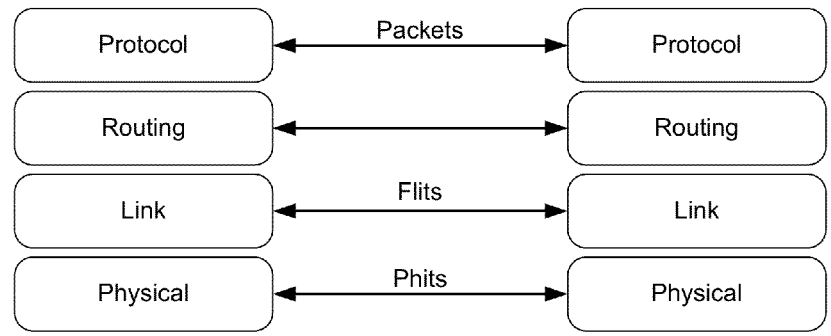
Fig. 1
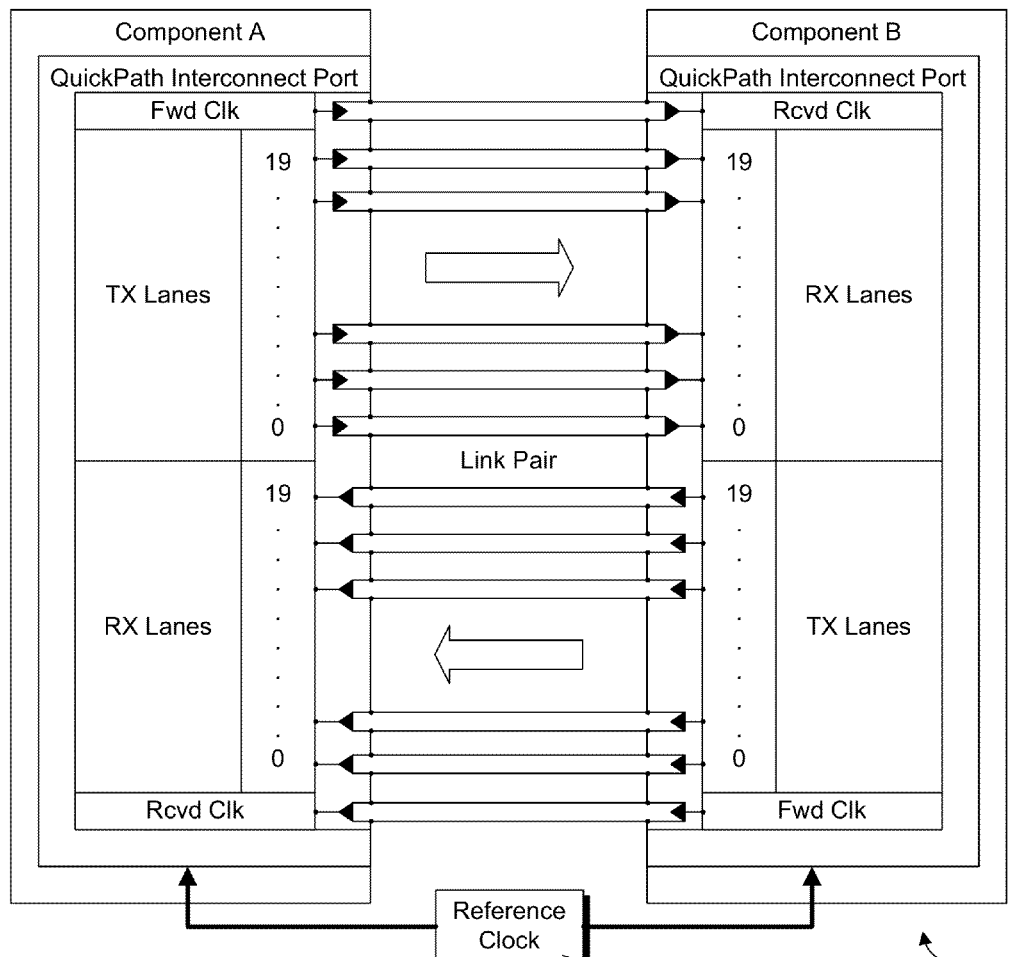
Fig. 2 *(Prior Art)*

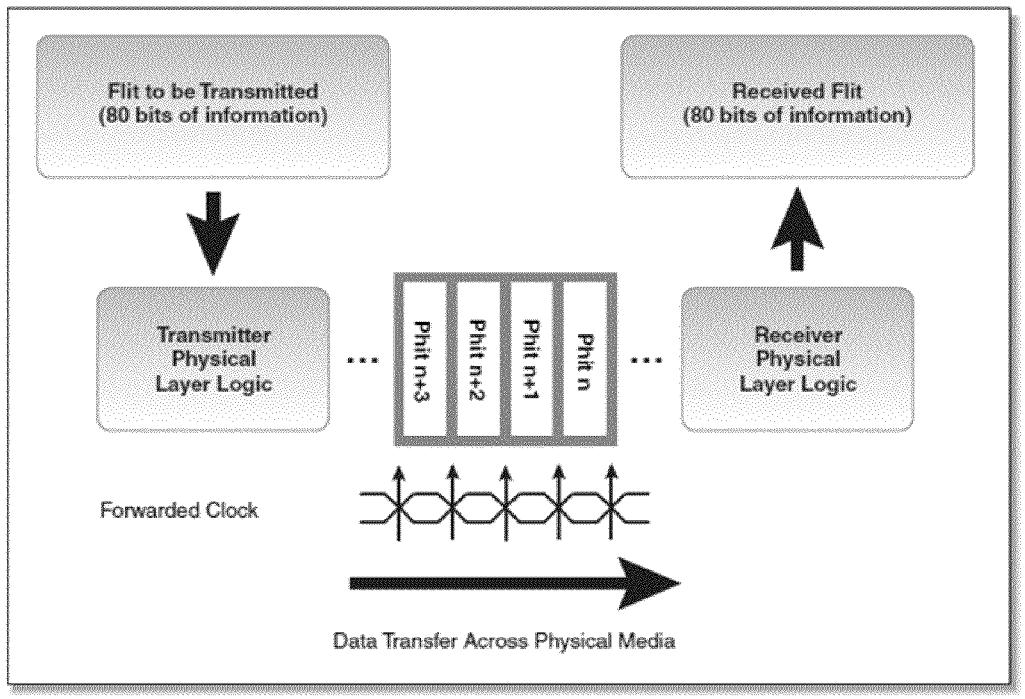
Fig. 3 *(Prior Art)*
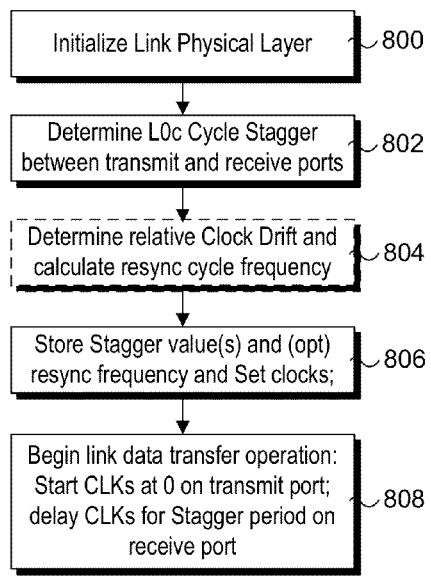
Fig. 8

| lane\ui | 0 | 1 | 2 | 3 | 4 | 5 | 6 | 7 |
|---|---|---|---|---|---|---|---|---|
| 0,12 | a | a | a | a | a | a | a | a |
| 1,13 | b | b | b | b | b | b | b | b |
| 2,14 | c | c | c | c | c | c | c | c |
| 3,15 | d | d | d | d | d | d | d | d |
| 4,16 | e | e | e | e | e | e | e | e |
| 5,17 | f | f | f | f | f | f | f | f |
| 6,18 | g | g | g | g | g | g | g | g |
| 7,19 | h | h | h | h | h | h | h | h |
| 8 | 0 | 0 | 0 | 0 | 0 | 0 | 0 | 0 |
| 9 | 0 | 0 | 0 | 0 | 0 | 0 | 0 | 0 |
| 10 | 0 | 0 | 0 | 0 | 0 | 0 | 0 | 0 |
| 11 | 0 | 0 | 0 | 0 | 0 | 0 | 0 | 0 |

Example abcdefgh codes with Hamming distance of 4:
00,33,0f,66,3c

*Fig. 10b*

EMBEDDED CONTROL CHANNEL FOR HIGH SPEED SERIAL INTERCONNECT

TECHNICAL FIELD

The field of invention relates generally to computer system interconnects and, more specifically but not exclusively relates to an embedded control channel in a high speed serial interconnect.

BACKGROUND ART

Computer systems typically employ one or more interconnects to facilitate communication between system components, such as between processors and memory. Interconnects and/or expansion interfaces may also be used to support built-in and add on devices, such as IO (input/output) devices and expansion cards and the like. For many years after the personal computer was introduced, the primary form of interconnect was a parallel bus. Parallel bus structures were used for both internal data transfers and expansion buses, such as ISA (Industry Standard Architecture), MCA (Micro Channel Architecture), EISA (Extended Industry Standard Architecture) and VESA Local Bus. In the early 1990's Intel Corporation introduced the PCI (Peripheral Component Interconnect) computer bus. PCI improved on earlier bus technologies by not only increasing the bus speed, but also introducing automatic configuration and transaction-based data transfers using shared address and data lines.

As time progressed, computer processor clock rates where increasing at a faster pace than parallel bus clock rates. As a result, computer workloads were often limited by interconnect bottlenecks rather than processor speed. Although parallel buses support the transfer of a large amount of data (e.g., 32 or even 64 bits under PCI-X) with each cycle, their clock rates are limited by timing skew considerations, leading to a practical limit to maximum bus speed. To overcome this problem, high-speed serial interconnects were developed. Examples of early serial interconnects include Serial ATA, USB (Universal Serial Bus), FireWire, and RapidIO.

Another standard serial interconnect that is widely used is PCI Express, also called PCIe, which was introduced in 2004 under the PCIe 1.0 standard. PCIe was designed to replace older PCI and PCI-X standards, while providing legacy support. PCIe employs point-to-point serial links rather than a shared parallel bus architecture. Each link supports a point-to-point communication channel between two PCIe ports using one or more lanes, with each lane comprising a bi-directional serial link. The lanes are physically routed using a crossbar switch architecture, which supports communication between multiple devices at the same time. As a result of its inherent advantages, PCIe has replaced PCI as the most prevalent interconnect in today's personal computers. PCIe is an industry standard managed by the PCI-SIG (Special Interest Group).

Recently, Intel introduced the QuickPath Interconnect® (QPI). QPI was initially implemented as a point-to-point processor interconnect replacing the Front Side Bus on platforms using high-performance processors, such as Intel® Xeon®, and Itanium® processors. QPI is scalable, and is particularly advantageous in systems having multiple processor cores employing shared memory resources.

QPI transactions are facilitated via packetized messages transported over a multi-layer protocol. As shown in FIG. 1, the layers include a Physical layer, a Link layer, a Transport layer, and a Protocol layer. At the Physical layer, data is exchanged in 20-bit phits (Physical Units). At the link layer phits are aggregated into 80-bit flits (flow control units). At the Protocol layer, messages are transferred between agents using a packet-based transport.

The Physical layer defines the physical structure of the interconnect and is responsible for dealing with details of operation of the signals on a particular link between two agents. This layer manages data transfer on the signal wires, including electrical levels, timing aspects, and logical issues involved in sending and receiving each bit of information across the parallel lanes. As shown by QPI architecture 200 in FIG. 2, the physical connectivity of each interconnect link is made up of twenty differential signal pairs plus a differential forwarded clock. Each port supports a link pair consisting of two uni-directional links to complete the connection between two components. This supports traffic in both directions simultaneously.

Components with QPI ports communicate using a pair of uni-directional point-to-point links, defined as a link pair, as shown in FIG. 2. Each port comprises a Transmit (TX) link interface and a Receive (RX) link interface. For the illustrated example, Component A has a TX port that is connected to Component B RX port. One uni-directional link transmits from Component A to Component B, and the other link transmits from Component B to Component A. The "transmit" link and "receive" link is defined with respect to a specific QPI agent. The Component A transmit link transmits data from Component A TX port to Component B RX port. This same Component A transmit link is the Port B receive link.

The second layer up the protocol stack is the Link layer, which is responsible for reliable data transmission and flow control. The Link layer also provides virtualization of the physical channel into multiple virtual channels and message classes. After the Physical layer initialization and training is completed, its logical sub-block works under the direction of the link layer, which is responsible for flow control. From this link operational point onwards, the logical sub-block communicates with the Link layer at a flit granularity (80 bits) and transfers flits across the link at a phit granularity (20 bits). A flit is composed of integral number of phits, where a phit is defined as the number of bits transmitted in one unit interval (UI). For instance, a full-width QPI link transmits and receives a complete flit using four phits. Each flit includes 72 bits of payload and 8 bits of CRC.

QPI employs both a common reference clock at each end of the link, as depicted by a common reference clock 202 in FIG. 2, and forwarded clock signals. The forwarded clock signals are used for phit timing aspects used for data recovery at the physical layer, as depicted in FIG. 3, which shows the relationship between two link layers and their corresponding physical layers. The link layer creates flits to be transmitted, and the physical layer breaks them up into multiple phits using timing provided the forwarded clock signals. These phits are then sent one after the other to the receiver end of the link. The receiver captures this data through use of the forwarded clock signals, and assembles the information back into the flits to pass on to the receiving link layer.

In addition to use for timing purposes, the physical lanes used for the forwarded clock signals are also used to facilitate sideband signaling for various purposes. For example, sometimes the flow of flits are interrupted in order to send control information relevant to the physical condition of the interconnect. To facilitate such an interruption, corresponding signals are sent over the forwarded clock lanes.

While QPI employs forwarded clock signaling, the use of such timing signals is not required for facilitating high speed serial interconnect links. For example, high speed serial interconnects such as PCIe employ 8b/10b encoding, which maps 8-bit symbols to 10-bit symbols to achieve DC balance while providing adequate state changes to facilitate clock recovery.

In view of this, the use of separate forwarded clock signals is optional with respect to link timing operations (acknowledging there are some advantages in using this approach, depending on the physical structure of the interconnect and operational environment). However, there is still a need for sending control information between link ports, which is facilitated, in part, through the use of the forwarded clock signal lanes under QPI, as discussed above.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1 shows the layers of the QPI protocol stack;

FIG. 2 is a schematic diagram illustrating the structure of a QPI link;

FIG. 3 is a diagram depicting usage of a forwarded clock to facilitate data recovery for a QPI link;

FIG. 5b is a time cycle graph depicting link cycle timing configurations implemented at transmitting and receiving ports corresponding to the timeflow diagram of FIG. 5a;

FIG. 8 is a flowchart illustrating operations performed to configured link state cycles at opposing ports of a high speed serial interconnect, according to one embodiment;

FIG. 10b is a table including an exemplary set of error correction code data;

DESCRIPTION OF THE EMBODIMENTS

Figure 4:
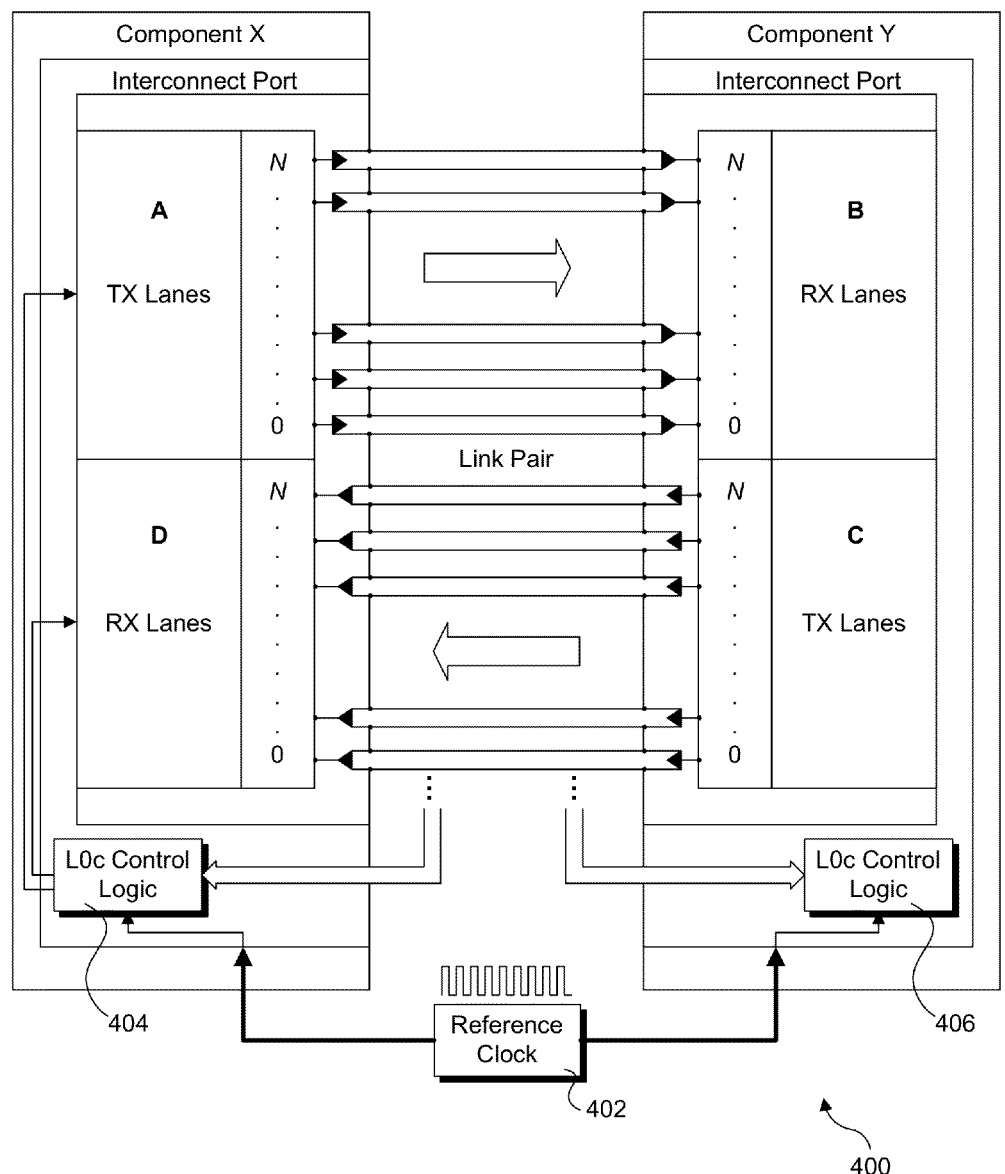
FIG. 4 is a schematic diagram of a high speed bi-direction serial interconnect employing a common reference clock and configured to implement an embedded control channel, according to one embodiment.

Embodiments of methods and apparatus for embedding a control channel in a high speed serial interconnects are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Some parts of the description will be presented using terms such as protocol, module, application, functionality, and so forth, commonly employed by those skilled in the art to convey the substance of their work to others skilled in the art. Other parts of the description will be presented in terms of operations performed by a computer system, using terms such as facilitating, determining, detecting, transmitting, receiving, and so forth. As is well understood by those skilled in the art, these quantities and operations take the form of electrical, magnetic, or optical signals capable of being stored, transferred, combined, and otherwise manipulated through mechanical and electrical components of a digital system; and the term "digital system" includes general purpose as well as special purpose data processing machines, systems, and the like, that are standalone, adjunct or embedded.

In some instances, methods and processes may be described as multiple discrete operations performed in a sequence in a manner that is most helpful in understanding corresponding embodiments. However, the order in which they are described should not be construed to imply that these operations are necessarily order dependent or that the operations be performed in the order in which they are presented.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In accordance with aspects of the embodiments described herein, techniques for embedding a control channel in high speed serial interconnects are disclosed. While not limited to a particular physical link configuration, there are aspects of some embodiments that are similar to those employed by QPI, such as implementation of a packet-based protocol using a multi-lane physical structure.

Embedded Control Channel Embodiments

In accordance with aspects of the embodiments now presented, novel techniques are disclosed that facilitate the exchange of link control information without the need for separate sideband signaling (and associated physical sideband lanes). Rather, exchange of control information is facilitated through the use of existing data traffic lanes, in combination with associated link protocols employing a periodic link control cycle.

FIG. 4 shows an exemplary interconnect architecture 400 that may be used to implement some embodiments. The general configuration of interconnect architecture 400 is similar to QPI interconnect architecture 200 discussed above, except there are no forwarded clock signals and corresponding lanes. The number of lanes (each representing a set of differential signal pairs (one pair for transmission, one pair for reception)), is depicted as N, wherein N generally may be any integer. In respective particularly embodiments, N is 2, 4, 5, 6, 8, 10, 12, 16, 20, 24, and 32. However, the number of lanes in these embodiments are exemplary and not to be limiting. Interconnect architecture 400 also shows implementation of a common reference clock 402. However, as described below, in some embodiments separate reference clocks are used for two components coupled in communication via an interconnect link having a structure similar to interconnect architecture 400.

Interconnect architecture 400 further includes a pair of L0c control logic blocks 404 and 406, one for each link port. L0 refers to a link state corresponding to normal data transfer operations, i.e., the link has been initialized and is up and transferring phits at the physical layer and flits at the link layer. L0c refers to a link state during which control information is transferred over one or more of the physical link lanes that are used for phit data transfer during L0 operations. As discussed in further detail below, L0c control logic blocks 404 and 406 include circuitry and logic for facilitating exchange of link control information over (normally used) link data lanes, thus removing the need for separate sideband lanes and associated signaling.

Figure 5A:
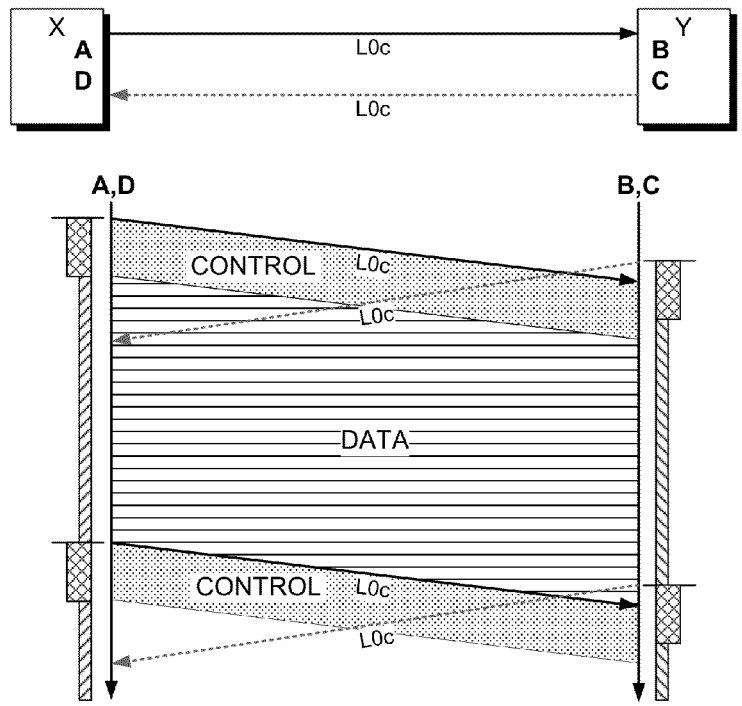
FIG. 5a is a timeflow diagram illustrating an exemplary configuration of link state cycles used to facilitate an embedded control channel; according to one embodiment.
Figure 5B:
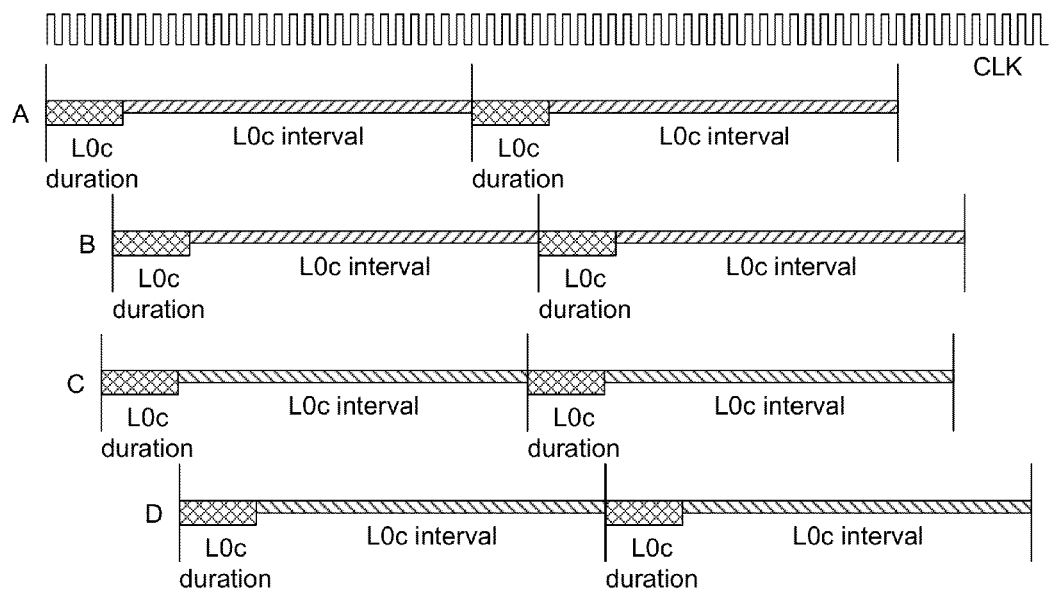

In one embodiment a link state timing cycle (also referred to as a link state cycle) is employed under which the link state is switched between an L0c state an L0c interval state (generally meaning an interval between L0c states during which any link operational state other than the L0c state may be implemented), such as depicted in FIGS. 5a and 5b. In further detail, FIG. 5a shows a control information exchange timeflow diagram illustrating control information (i.e., data) being sent between four ports labeled A, D, B, and C, which respectively correspond to the transmit (TX) lanes and receive (RX) lanes of component X and the transmit and receive lanes of component Y shown in FIG. 4. Meanwhile, FIG. 5b shows the L0c and L0c interval state cycle timing for ports A, B, C and D relative to a reference clock signal CLK. It is noted that these timing diagrams are not to scale, and that the relative sizes of the L0c period and L0c interval periods (i.e., time segments) are exaggerated for clarity. Under a typical implementation, the duty cycle represented by the L0c portion of a link state cycle will be much less than 1%.

As shown by the timeline in FIG. 5a, there is a finite amount of time comprising a transit latency between when control information is sent outbound on a transmit port on one side of the link and received at a receive port on the other side of the link. As before, the times illustrated are not to scale, but are for illustrative purposes. In view of this transit latency (i.e., the lapsed time that occurs between clock cycles corresponding to sending the first phit of a given message or message sequence outbound from a transmitting port and reception of that first phit at a receiving port at the opposing end of the link), the timing (i.e. start point) between when ports are cycled between L0c and L0c interval states is staggered (i.e., offset in absolute time). In one embodiment, the timing of L0c/L0c interval timing cycles for a given link port pair is staggered so as synchronize the timing cycles at the transmitting and receiving ports. In one embodiment, the staggered time value (in clock cycles) is determined during link initialization and/or link training operations, as described below with reference to FIG. 8.

As further shown in FIG. 5a, the effect of using the L0c/L0c interval timing cycles is that link control information may be periodically sent on a cyclic basis using a timing cycle having a nominal periodicity, with the link being used for normal data transfer or other purposes during the L0c interval between two L0c periods. The use of "may" here is used to indicate that in one embodiment there is no need to transfer any data during any particular L0c period. Optionally, in one embodiment, the equivalent of a null packet or No Op (No Operation) may be sent during any L0c period for which no link control information is to be sent. The term "nominal" periodicity means that for most cycles the period between L0c period and L0c intervals is the same, but there may be cycles during which an L0c period or an L0c interval is adjusted, such as described below.

Figure 5C:
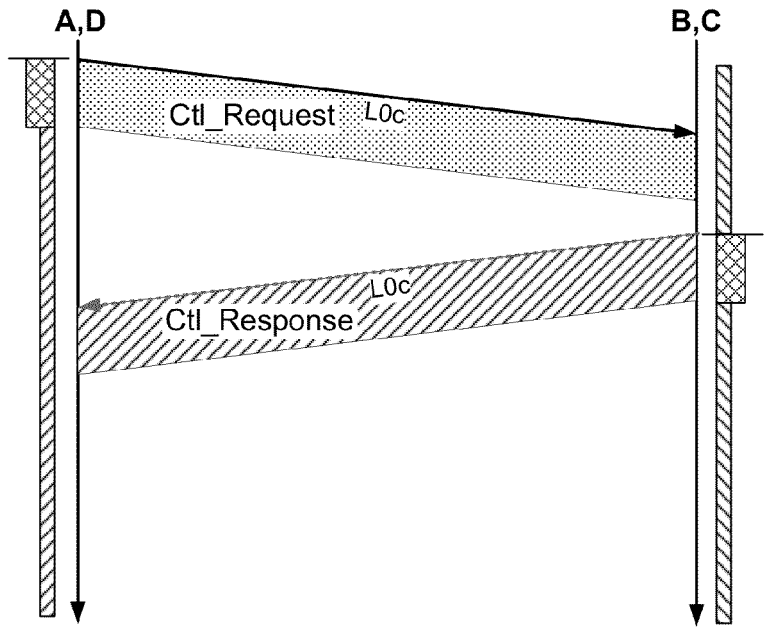
FIG. 5c is a timeflow diagram illustrating a configuration of link state cycles for facilitating a request/response link control protocol.

The relative timing of the L0c cycles at the ports on opposing ends of a link is configurable. For example, FIG. 5a illustrates an embodiment under which the timing of the L0c/L0c interval cycles for different link directions is independent. As illustrated, there is an overlap during which both sides are in an L0c state and may be sending and (after a transmission latency delay) receiving link control information. An L0c cycle timing corresponding to a link control Request/Response protocol configuration is shown in FIG. 5c. Under this configuration, a first port sends a link control request to the opposing port, which processes the request (e.g., via its L0c control logic or other logic in the link port or associated link agent) and sends back a response. It is noted that a request/response sequence is not limited to this type of arrangement, as the timing of a response merely needs to follow a request during some subsequent time (including the option of skipping a cycle between a request and response). For example, under the L0c timing of FIG. 5a, a request sent from port X during X's first L0c period could be responded to by port Y during Y's second L0c period. It also is noted that some requests may be directives, i.e., commands with no expected response.

Figure 5D:
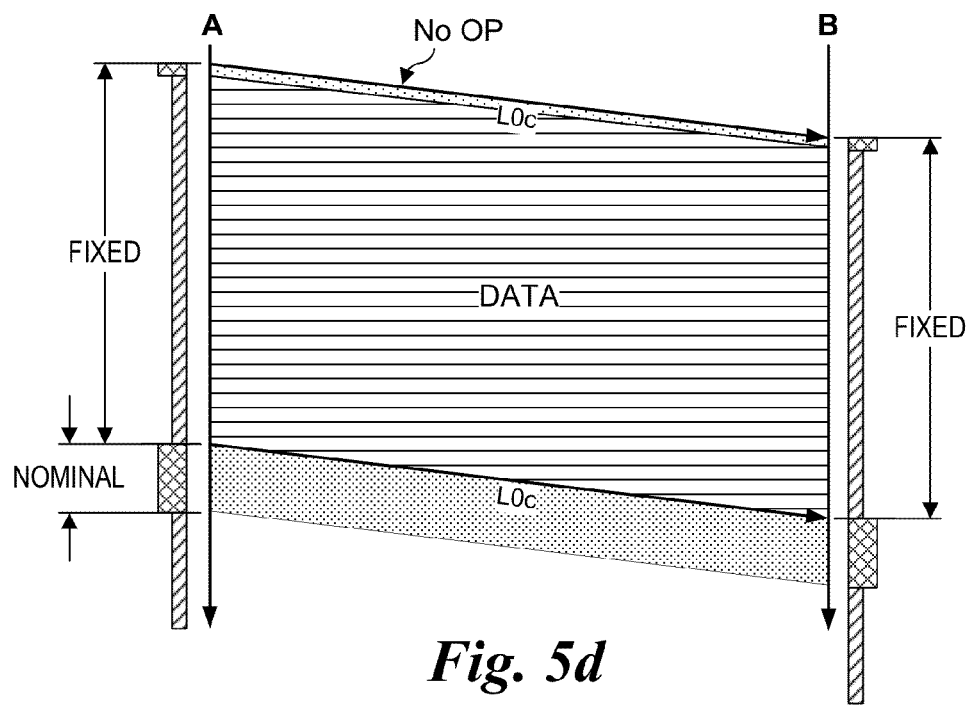
FIG. 5d is a timeflow diagram illustrating shortening of a link control period in accordance with a No Operation condition.

The length of a given L0c period generally may be fixed, variable and/or dynamically adjusted. For example, under one embodiment L0c periods are started using nominally fixed time cycles (i.e., the amount of time between start points for successive cycles is fixed), as shown in FIG. 5d. Generally, each L0c period will have a nominal length, such as depicted by L0c blocks in FIGS. 5a-5c having a similar size to the block with a length depicted as 'NOMINAL' in FIG. 5d. In some embodiments, the nominal length may correspond to the amount of time needed to send a single piece of link control information, such as a command or response, or alternatively, the nominal length may correspond to the amount of time need to send the most amount of link control information that is permitted to be transferred during one L0c period. However, the use of a nominal period length may be wasteful, since there may be instances (actually the most common situation) under which there is no need to convey any link control information (e.g., the link condition is determined to be fully functionality without any errors and/or potential failures). Accordingly, it would be advantageous to reduce the nominal period length such that the reduced portion of the period could be used for normal data transfer (e.g., link state L0) or other purposes, such as operating the link in a reduced power state. In some embodiments, the length of an L0c period may be varied based on link control data sent between a transmit port and receive port during the period. For example, in one embodiment link control information corresponding to a No OP indicator or null phit or the like may be sent over the link at the beginning of an L0c period. Upon receiving the No OP indicator, the L0c period on the receive side will be shortened to the No OP cycle length, with a similar L0c period shortening taking place on the transmitting side. This result is illustrated in FIG. 5d, with the net effect being a lengthening of the L0c interval for the current cycle.

An aspect of this L0c link state cycle approach is that there is no need to inspect phit data content to determine if the phit data corresponds to control information or, e.g., normal data traffic. Rather, the logic at each end of the link processes data sent over one or more lanes during L0c periods as link control information, and data sent over the link lanes during L0c intervals in accordance with the applicable link state during the intervals. Moreover, there is no need to use separate sideband signals to facilitate transfer of link control information between link ports.

Figure 4A:
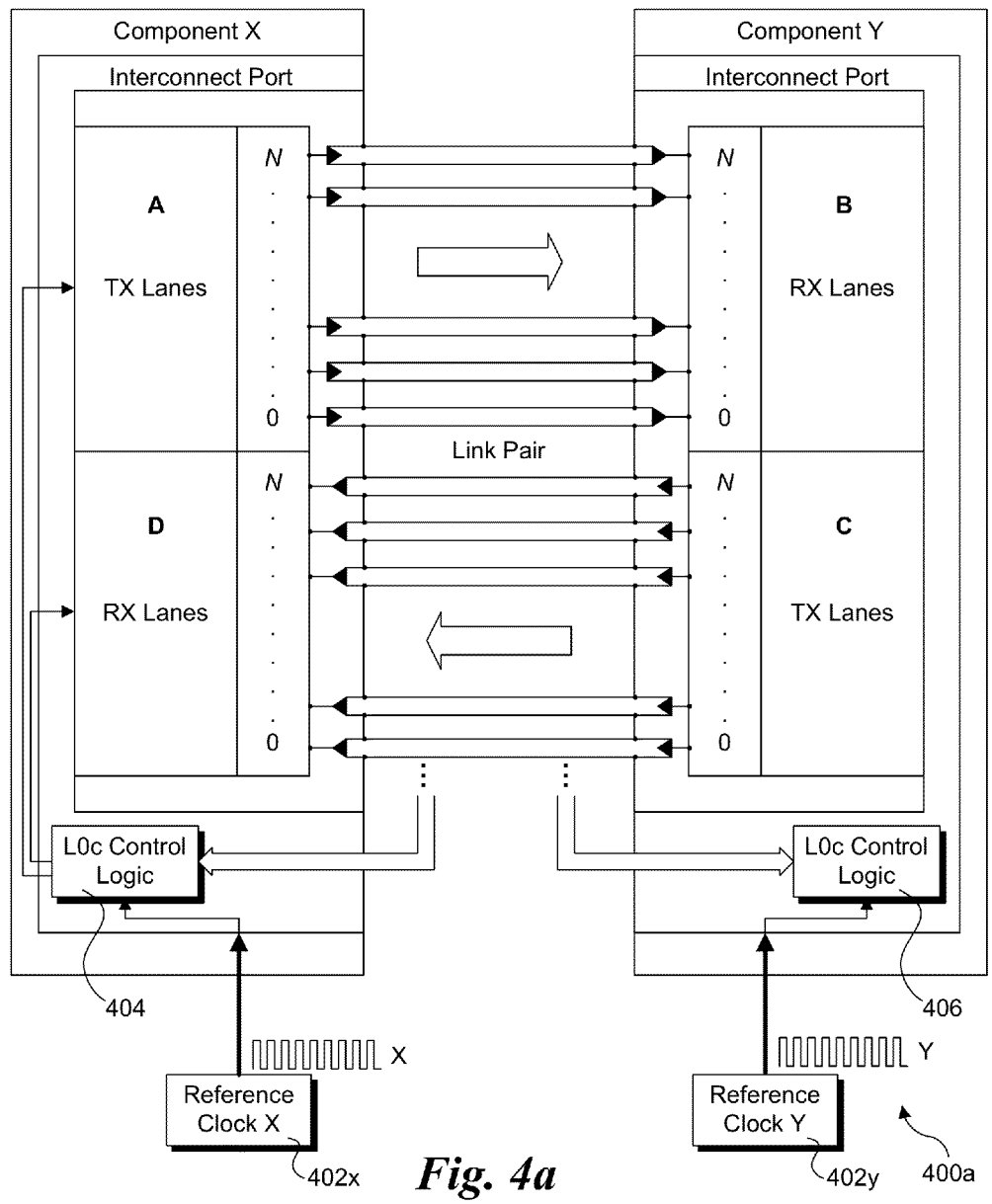
FIG. 4a is a schematic diagram of a high speed bi-direction serial interconnect employing separate reference clocks and configured to implement an embedded control channel, according to one embodiment.

In some embodiments, the ports on components coupled in communication via a high speed serial interconnect may use separate reference clocks. For example, FIG. 4a shows an interconnect architecture 400a employing two reference clocks 402x and 402y that provide respective clock inputs to the interconnect ports of components X and Y. As will be recognized by those skilled in the semiconductor arts, the clock rates of a pair of reference clocks, particularly if implemented on separate discrete components, typically will not match identically. As a result, one clock frequency will be faster than the other clock frequency, causing a clock drifting effect over time. As a result, the L0c clock cycles between the two components employing separate reference clocks will become misaligned if no compensation measure is employed, resulting in potential loss of data and/or otherwise errant operation.

Figure 6:
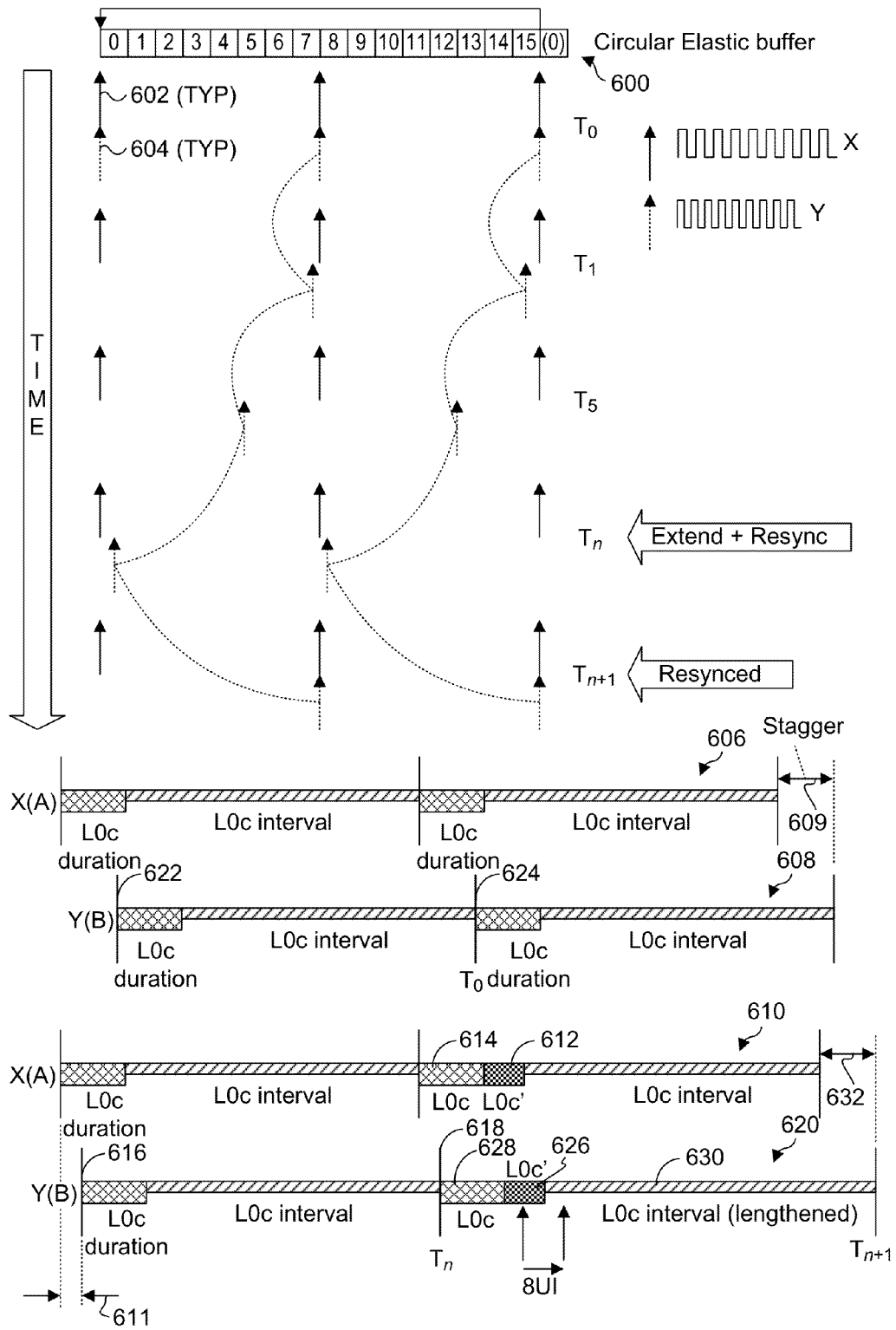
FIG. 6 is a combination timeflow diagram and time cycle graph depicting an implementation of a link control period extension and resync mechanism used to realign timing cycles for interconnect links employing separate reference clocks, according to one embodiment.

An illustration of the clock misalignment effect and one embodiment of a compensation scheme for addressing the effect is shown in FIG. 6. At the top of the Figure are two clock representations for clock X and Y, depicting the clock frequency of clock Y being higher than that for clock X (greatly exaggerated for illustrative purposes). The top portion of FIG. 6 shows a circular elastic buffer 600 above a series of five time snapshots depicting the relative positions of a write pointer 602 and a read pointer 604, respectively corresponding to the first bit of bytes sent from component X and received by component Y. For illustrative purposes, circular elastic buffer 600 is shown as 16 bits (two bytes) in length, but it will understood that this is merely exemplary, as the size of circular elastic buffer 600 may vary depending on the particular implementation.

At time $T_0$, the pointers are aligned at the byte boundaries of bit positions 0, and 8 (position 0 is repeated at the right hand of the diagram, as well). The pointer positions are depicted relative to a time scale used for component X, and as such the pointers 602 (depicted as solid lines) are shown as being correctly aligned throughout the diagram. Meanwhile, since the frequency of component Y's clock is greater than that for component X, the bit position of pointers 604 (depicted in dotted lines) relative to the timescale of component X will cause a drifting to the left. This drifting is illustrated at times $T_1$ and $T_5$, with drifting continuing up until a time $T_n$.

Since the circular elastic buffer is nominally two bytes in length and (for point of illustration) one byte is buffered at a time, the aggregate misalignment between the clocks for components X and Y can be up to one byte before problems may occur. Upon detection of such a condition (or detection just prior to such a condition), an extension and resyncing mechanism is implemented to prevent buffer overflow and to resync the pointers. (It is noted that since the circular buffer is elastic, buffer overflow may be avoided by temporally extended the effective size of the buffer; however for point of illustration it is desirable to not have to extend the buffer size.)

In the embodiment illustrated in FIG. 6, an extension period L0c' is added to the L0c period at each of the sending and receiving ports, as depicted toward the bottom of the diagram. In further detail, this portion of the diagram depicts cycle graphs for a link between a sending port A on component X (X(A) and a receiving port B on component Y components Y(B) for times $T_0$ and $T_n$. The cycle graphs for X(A) and Y(B) to not depict a timing relative to a fixed reference frame, but rather each cycle graph depicts a processing cycle for each of X(A) and Y(B) relative to its own reference frame.

The top two cycle graphs 606 and 608 depict aligned timing for the link corresponding to time $T_0$. As before, the timing between the cycle graphs is staggered by an initial stagger 609 to account for the latency for transport across the link. During ongoing processing, the clock rate of component Y is greater than component X, as discussed above. As a result, the lengths of both the L0c duration and L0c interval for component Y is depicted as being slightly less than the L0c duration and L0c interval for component X, resulting in a reduced stagger 611 at time $T_n$. Of course, the stagger relative to a common time reference frame for components X and Y will remain the same. The reduction in stagger corresponds to the clock drift for component Y relative to component X The L0c start points of cycle graph 606 are aligned with those in a cycle graph 610, which includes an L0c' period 612 that is added after a second L0c period 614. As before, the lengths of the L0c and L0c' periods relative to the L0c intervals are greatly exaggerated. Meanwhile, the first two L0c start points 616 and 618 for a cycle graph 620 corresponding to port B of component Y have drifted to the left relative to corresponding L0c start points 622 and 624 for cycle graph 608. As with cycle graph 610, an L0c' period 626 is added after the second L0c period 628.

During L0c' period 626, Port B pushes its read pointer 604 back 8 UI. The effect of this is depicted in FIG. 6 by a lengthening an L0c interval 630; however, in actuality the L0c interval length is not changing, but rather this is to illustrate the result of pushing the read pointer back. This results in a stagger 632 that is the same as initial stagger 609 at time $T_{n+1}$, such that alignment of the timing cycles is returned to the initial alignment configuration shown at time $T_0$.

In general, the transmitting port can be used to effect addition of an L0c' period, or such an L0c' period may be periodically added based on a clock drift determination scheme, as described below. Under one embodiment, an L0c' period is invoked by a transmitting port sending a request (for implementing an L0c'), with the receiving port responding with an ACK message, and both ports implementing the L0c' period following the next L0c period. Optionally, information sent during a current L0c period may be used to effect an immediate (to follow) L0c' period.

A similar compensation scheme may be implemented under situations in which the clock frequency of a receiving port is less than the clock frequency of a sending port. In this instance, the relative byte pointers at the receiving port would drift to the right, eventually resulting in an overfill condition if no compensations was provided (presuming for the moment that the circular buffer on the receive port is non-elastic). As before, an L0c' period is added during which the transmitting port stops sending out data, allowing the circular elastic buffer at the receiving port to catch up. Additionally, the transmitting port's L0c interval is shorted so as to realign the time cycles of the transmitting and receiving ports.

Figure 7:
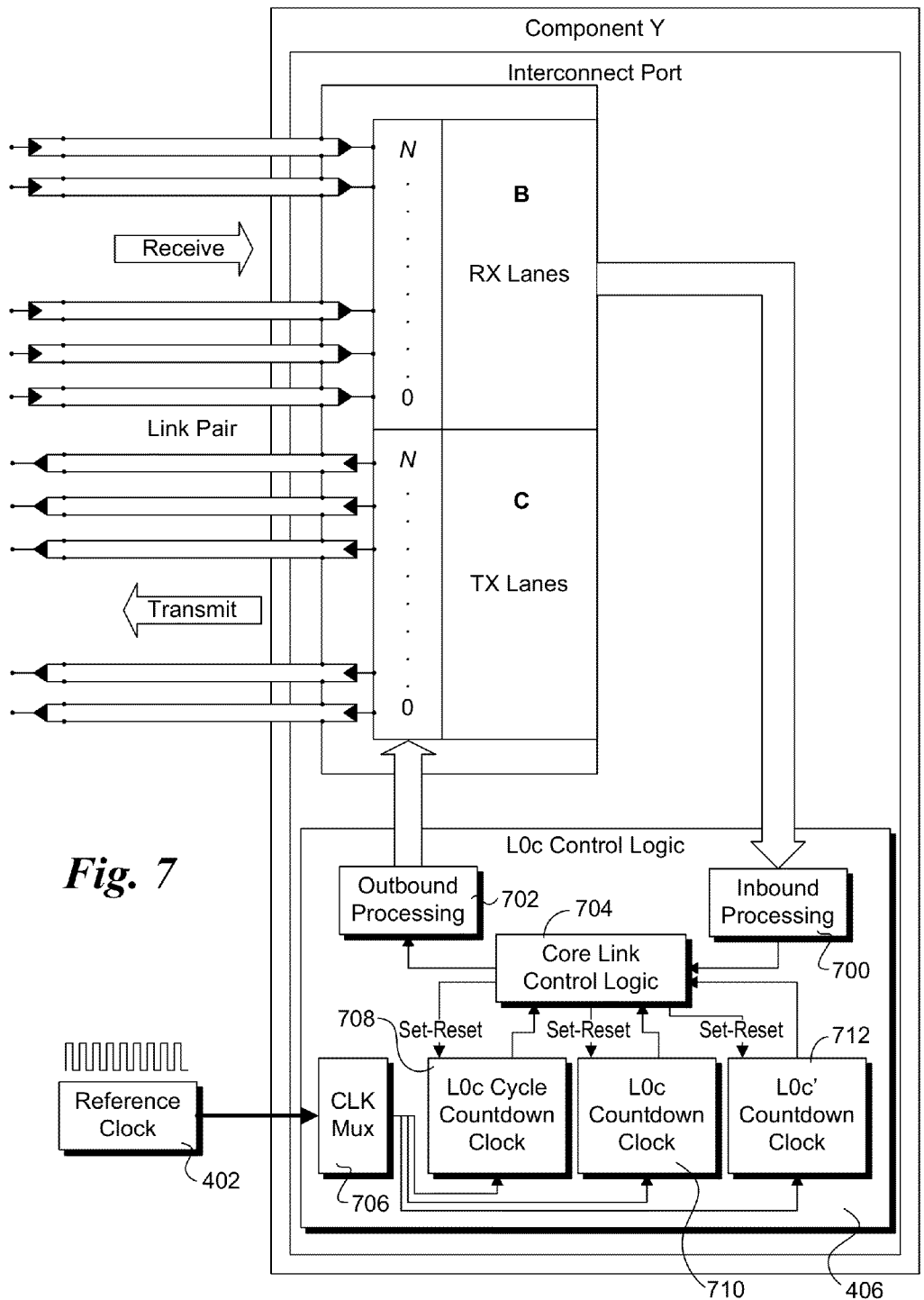
FIG. 7 is a schematic diagram illustrating further details of link control logic employed in the high speed bi-direction serial interconnect of FIG. 4; according to one embodiment

FIG. 7 shows further details of L0c control logic block 406, according to one embodiment. As shown, L0c control logic block 406 includes an inbound processing block 700, an outbound processing block 702, a core link control logic block 704, a clock multiplexer (CLK Mux) 706 with Phase Lock Loops (PLLs), an L0c cycle countdown clock 708, an L0c countdown clock 710, and an L0c' countdown clock 712.

During ongoing operations, the various blocks are generally controlled by core link control logic block 704, which processes inbound link control data received during L0c and L0c' periods and generates outbound link control data to be sent during L0c and L0c' periods. Inbound processing block 700 performs operations associated with aspects of processing data received on one or more RX lanes, as described in further detail below. Similarly, outbound processing block 702 prepares data to be transmitted outbound on one or more TX lanes. Other aspects of physical layer operations relating to receiving and transmitting data may generally be performed by other components in an interconnect port interface that are not shown in FIG. 7. Moreover, although inbound processing block 700 and outbound processing block 702 are depicted within L0c control logic block 406, all or a portion of the operations performed by these blocks may be performed by other functional blocks (not shown) employed for inbound and outbound processing of data over the RX and TX lanes.

Core link control logic block 704 is also employed for controlling the L0c cycle timing and configuration. In the illustrated embodiment, a reference clock signal for reference clock 402 is received at CLK mux 706, whose PLL generates higher frequency multiple signals that are used as clock inputs to each of L0c cycle countdown clock 708, L0c countdown clock 710, and L0c' countdown clock 712. The timing and configuration of various L0c cycles can be managed via inputs to these countdown clocks (also referred to as count-down timers), as depicted by the Set-Reset inputs having arrows pointing into the countdown clocks. The Set input is used to set the number of clock cycles to be counted down, while the Reset input is used to reset the clock cycle count to the Set value, which may typically be stored in a register or the like. Each of L0c cycle countdown clock 708, L0c countdown clock 710, and L0c' countdown clock 712 generate an output signal when their respective countdown value reaches 0 that is receives as an input by core link control logic block 704. This input is then processed by core link control logic block 704 to control the link cycle state, such as beginning and ending L0c and L0c' periods.

In general, the functionality and operations implemented via the various blocks shown in L0c control logic block 406 may be implemented using various forms of embedded logic. Techniques for embedding logic in functional blocks on integrated circuits such as processors and the like are well-known in the processor arts, and accordingly, additional details for implementing the embedded logic are not provided herein.

With reference to the flowchart of FIG. 8, in one embodiment link initialization and configuration proceeds as follows. In a block 800 the link physical layer is initialized, which may entail operations typically performed to initialize the physical layer, such as link training operations. During this time, or in a separate operation shown in a block 802, the L0c cycle stagger between transmit and receive ports is determined. This can be determined using various schemes, such as based on a round-trip latency or otherwise determined via link training. For example, a strobe or predefined pattern may be sent periodically from a transmit port to a receive port. Upon recognizing the strobe or predefined pattern, the receive port sets the start point of its L0c period to the strobe or some position in the pattern, while the transmitter port does the same. This synchronizes the L0c cycles at the transmitter and receiver ports with an optimum stagger, such that there receiver port does not need to enter an L0c cycle early to "listen" for link control information. It is noted here that synchronized L0c cycles will not be synchronized in real clock time, both rather synchronized relative to transmission and reception of data over the link. The stagger can also be set to a predetermined value during initialization. Under a round-trip latency approach, the time for turnaround and receipt processing may be determined in advance (this will generally be a fixed value for a known data transfer), and the latency due to this portion of the transfer can be subtracted, with the remainder round-trip latency divided by two to yield the one-way link latency. As yet another approach, the stagger may be calculated based on the length of the link segment between the transmitting and receiving ports. In general, the amount of stagger will typically be very small for links between components or logic blocks on a System on a Chip (SoC), longer for links between discrete components within a system (e.g., a serial link between a processor interface and a peripheral component on a computer platform main board), and potentially much greater for serial links between a computer platform (e.g., personal computer, server, etc.) and an external peripheral (the amount of stagger will be a function of the length of the interconnect cable coupling the two in communication).

For links that use separate reference clocks, a relative clock drift and resync cycle frequency is determined in Block 804, which is depicted in dashed outline to indicate this is optional (e.g., would not apply to links employing a common reference clock). Each reference clock operates at a fixed frequency that is a function of its reference crystal or the like. By exchanging information between the link ports, such as through use of a predetermined pattern during link training, a relative drift between the reference clocks can be determined using well-known techniques. Based on this information, a resync frequency (that is, how often an extend and resync operation employing L0c' periods is to be implemented) can be determined.

In a block 806 the stagger value(s) and optional resync frequency values are stored by the link control logic at each end of the link, and the initial clock values are set. This is used to initialize the L0c timing cycle configurations. It is noted for synchronized ports that once synchronization is achieved it is advantageous to continue operating the ports in a synchronized manner during initialization operations. The link data transfer operations can then begin in a block 808.

Figure 9A:
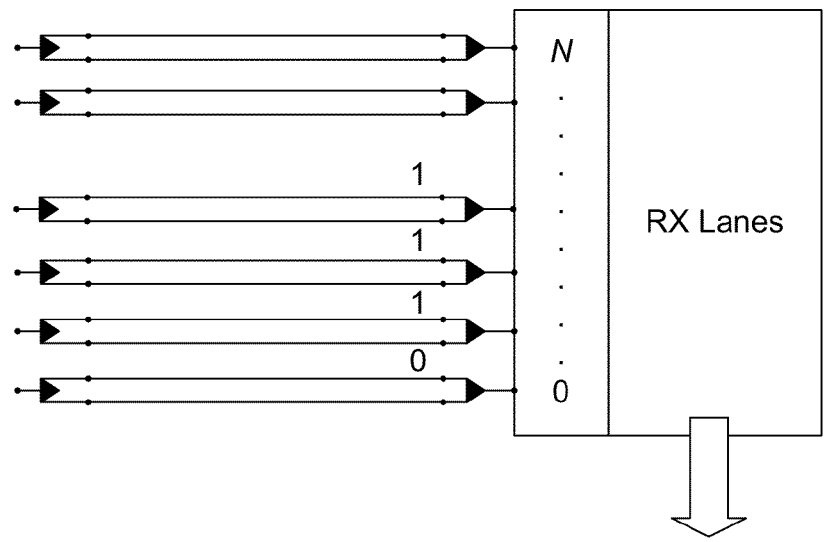
FIG. 9a illustrates a link control protocol implemented by sending multiple bits of data over multiple interconnect lanes during one unit interval, according to one embodiment.
Figure 9B:
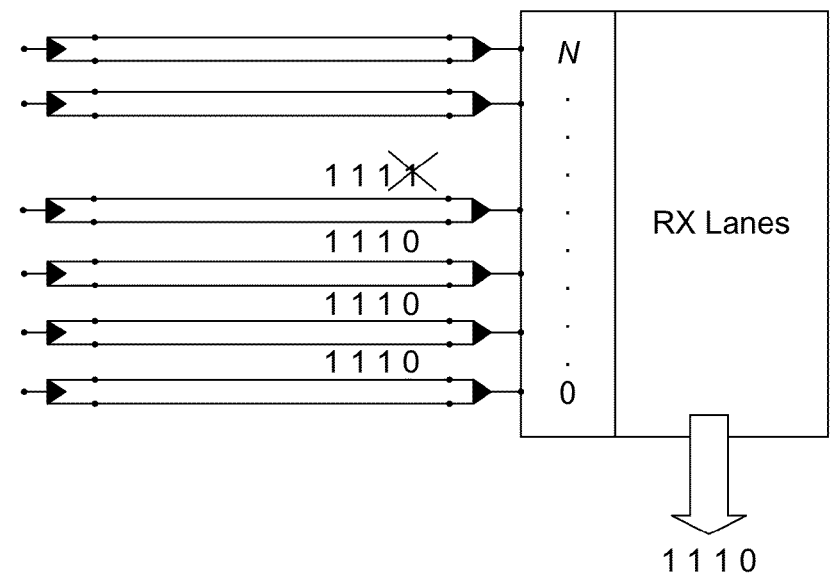
FIG. 9b illustrates a link control protocol under which a common bit sequence is sent over multiple interconnect lanes, according to one embodiment.

There are various techniques that may be used to transfer link control requests (such as commands), and responses (such as ACKnowledgements), depending on the particular implementation and the control operations to be processed. Two examples corresponding to a 4-bit request and response protocol are shown in FIGS. 9a and 9b. Under the scheme in FIG. 9a, a 4-bit request or response is transferred during a single UI by using lanes 0-3 of the link. Under this approach, the number of unique request and responses is dependent on the number of lanes used. For example, an 8-bit protocol would be implemented using 8 lanes, and facilitate a combination of 256 unique request and responses. In addition, a portion of the bits may be used for request/responses, while another portion may comprise data relating to information associated with a particular request or response. For example, if the link width is X lanes, Y lanes could be used for unique request/response codes and all or a portion of the remaining (X-Y) lanes could be used for data relating to the request/response.

The approach used in FIG. 9b is designed for robustness. Under this approach, a bit sequence corresponding to the same command is sent over multiple lanes and multiple UIs. Upon receipt, the bits are compared and the most common bit value during each UI is forwarded on for processing. For example, since a bit value of '0' is most common for the first bit received, a value '0' is output by applicable logic (not shown) as the first bit value. In general, under the multiple UI protocol there is no relationship between the number of lanes used and the length (in bits) of the commands used by the protocol, although both may be the same, such as illustrated in FIG. 9b.

Figure 10A:
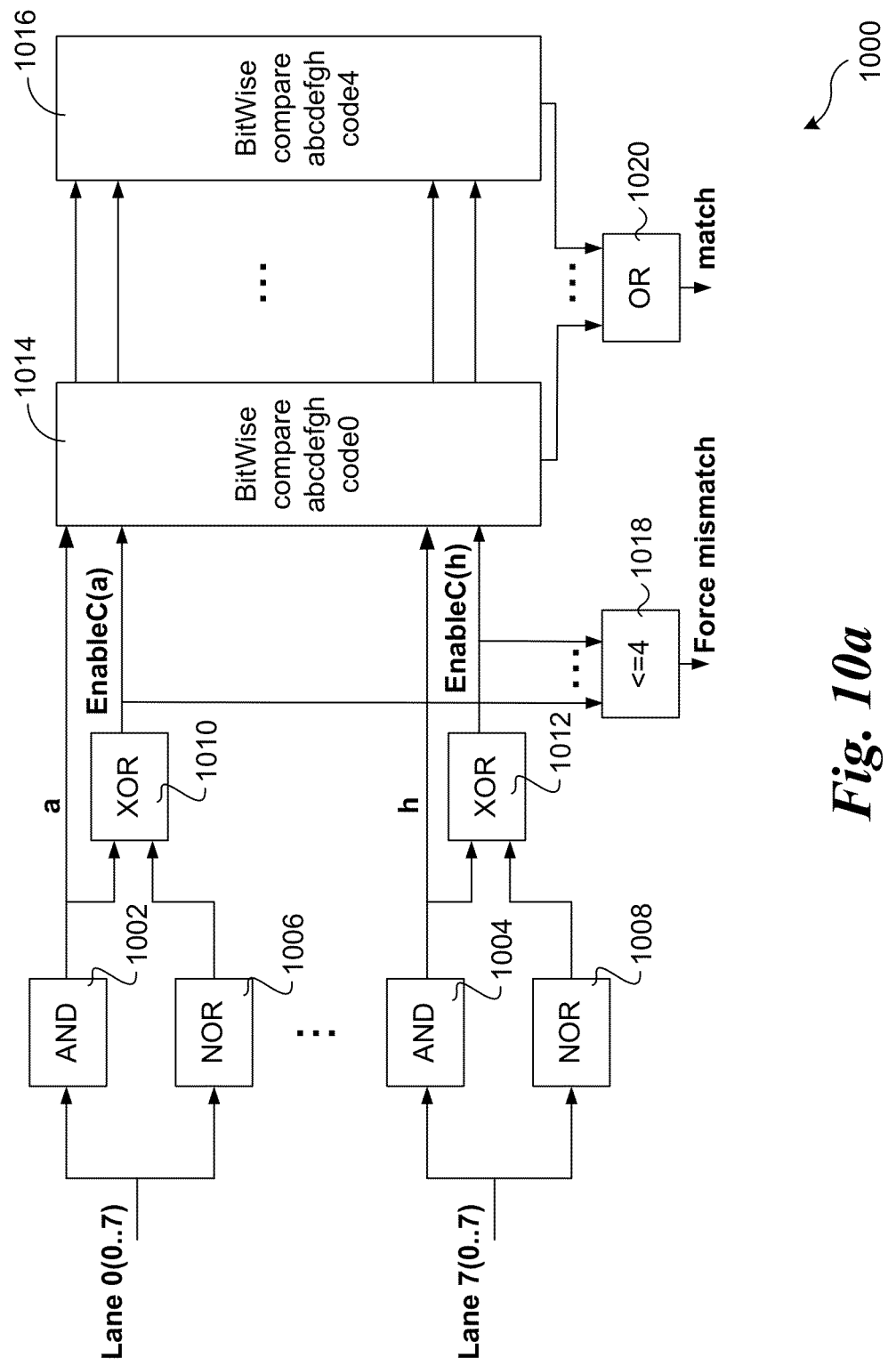
FIG. 10a is a logic diagram illustrating logic for detecting mismatches and correcting errors in commands that are send over multiple lanes in parallel.

FIG. 10a shows a logic diagram 1000 illustrating logic blocks for implementing the robust aspects of FIG. 9b over FIG. 9a using 8 lanes, according to one embodiment. The logic blocks include AND blocks 1002 and 1004, NOR blocks 1006 and 1008, XOR blocks 1010 and 1012, bitwise comparators 1014 and 1016, a comparator 1018, and an OR block 1020. FIG. 10b is a table showing exemplary error correction code (ECC) data that can be sent over corresponding lanes and UIs. In the example illustrated in logic diagram 1000, 8 UIs are used along with 8 bit codes that are compared on a bitwise basis. However, this is merely exemplary, as other bit lengths may be used.

During operation, sequences of data bits are received over Lanes 0-7 over 8 UIs. Logic for processing input data for Lane 0, and Lane 7 are depicted, with it understood that similar frontend logic comprising AND, NOR, and XOR blocks are implemented for Lanes 1-6 (not shown). In conjunction with data 8 lanes of data sent during each UI, the frontend logic detects whether there are any mismatch bits. If so, the mismatch lane count is incremented by 1. In one embodiment, a detected condition of 4 or more mismatches causes comparator 1018 to output a force mismatch signal, indicating the command is faulty. Otherwise, bitwise comparators 1014 and 1016, along with bitwise comparators to configured to match the number of codes used that are not shown, determine the command bits that are derived from the most common bits for each UI. The AND and NOR circuits in example look for all UI to match, Instead of unanimity, voting methods can be used. For example, if during a given UI 6 bits have a value of '1' and 2 bits have a value of '0', the bit value '1' is the most common and is output as the bit value for that UI. Accordingly, the logic allows for some level of mismatch in the received data, while detecting the most likely command data from which a detected command is determined.

In other embodiments, existing data formats and/or a combination of formats may be used. For example, a command with an optional data payload may be transferred as a single phit or a flit. Moreover, the use of the single phit or flit may use the full lane width of a link, or use a portion of the available lanes. As another option, one or more bits sent over corresponding lanes during a first UI may be employed to signal a type of request or response associated with a link control operation. For example, a No OP could be defined by a bit value of '0' on lane 0, multiple lanes, or all lanes. In response to detection of this bit value, the logic would interpret the command as a No OP. Similarly, another bit value or a set of bits could be used to signify the command is not a No OP, with additional request/response data being sent via other lanes during the same UI, and/or during one or more subsequent UIs. For example, during a first UI a multi-lane bit pattern could be transmitted to indicate that a more complex command is to follow, wherein the complex command might be facilitated through use of a subsequent flit.

In addition to implementation of request/response control information protocols, L0c periods may be used for other purposes. For instance, L0c periods may be used to transmit monitor patterns that can be employed to reduce bit error rate (BER) for a link, or to provide better RAS (Reliability, Availability, and Serviceability) by identifying lanes that are potential candidates to fail. A protocol may employ L0c periods for link state changes, such as enabling two ports to enter low-power state in a negotiated manner. L0c periods may also be used as a backchannel on adaptive links.

In addition to the embodiments illustrated herein, other schemes may be implemented. For example, L0c can be used to send traffic at different rates and/or using different encodings or protocols in one or both directions. The sending of requests and responses may be implemented concurrently in both directions, implementing fixed or dynamically varied L0c intervals. For instance, proximate to the timeframe illustrated in FIG. 5c, port B could send a control request to port A, and port D could return a control response to port C. Moreover, L0c implementations in two directions may be synched to each other and/or a platform alignment signal for lock-step operation. The illustrated embodiments and/or extensions may include defined sequences for repeaters, probes, etc. that may not implement L0c. For example the L0c code may be unscrambled while the data flits could be scrambled, such as through use of a Pseudo-Random Bit Sequence (PRBS). Additionally, logic analyzers and probes may be configured to trigger on the periodically repeating occurrence of the L0c code. The L0c control information may include requests relating to power states, power state changes, and dynamic adaptation parameters.

Figure 11:
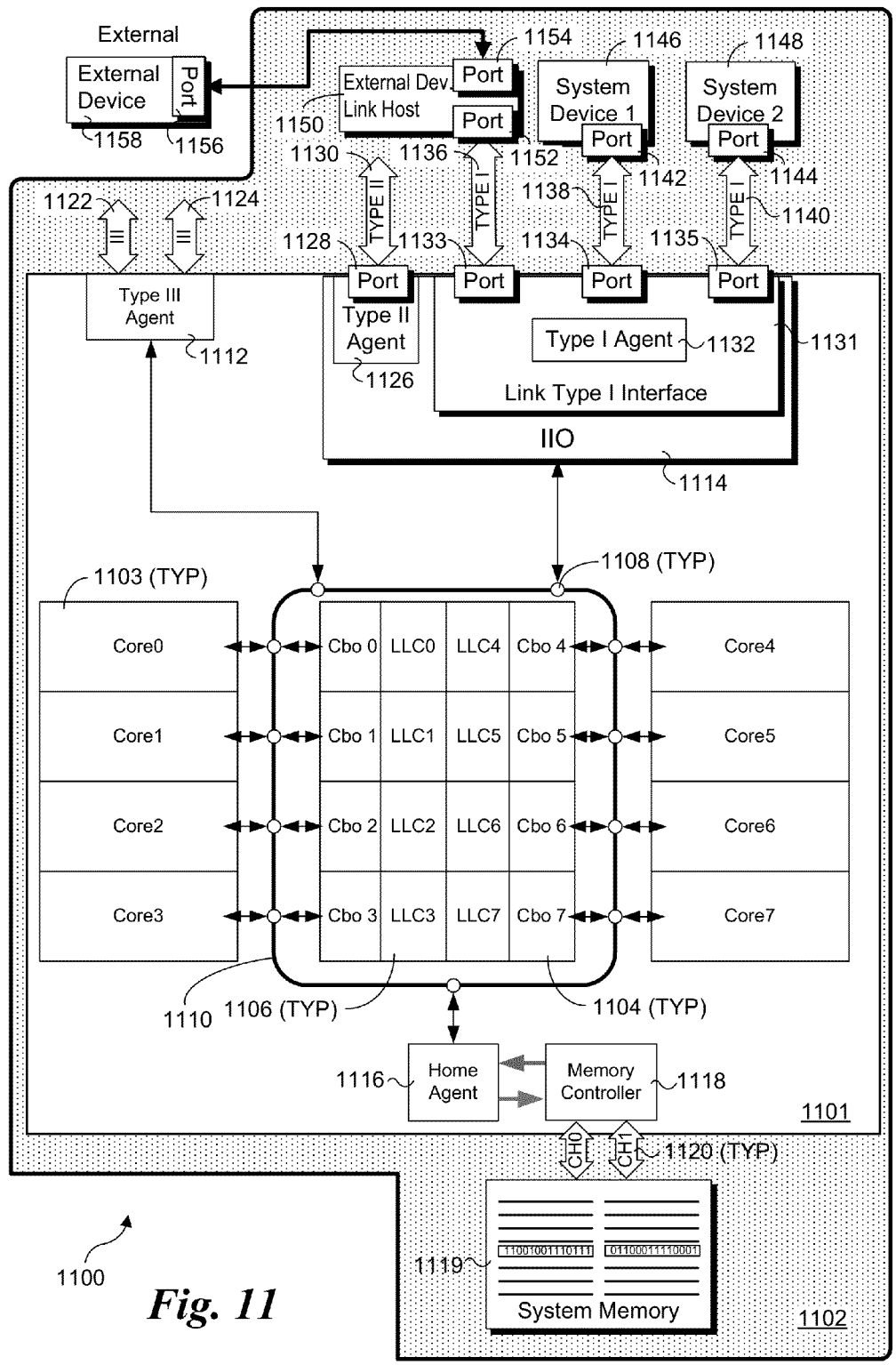
FIG. 11 is a schematic block diagram illustrating selected components of an exemplary processor and platform configuration via which aspects of the embodiments disclosed herein may be implemented.

FIG. 11 shows a platform architecture 1100 illustrating an exemplary processor and platform configuration via which aspects of the embodiments disclosed herein may be implemented. Platform architecture 1100 depicts an 8-core processor 1101 mounted on a system board 1102 and including processor cores 1102 (labeled Core0-Core7), which are coupled to respective caching boxes 1104 (labeled Cbo 0-7, also referred to as CBOXes) and last level caches (LLCs) 1106 (labeled LLC0-LLC7) via nodes 1108 on a ring interconnect 1110. Also connected to ring interconnect 1110 via corresponding nodes are a Type III agent 1112, an Integrated Input/Output (IIO) block 1114 and a Home Agent 1116. Home agent 1116 is coupled to a memory controller 1118, which is used to access system memory 1119 via one or more memory channels 1120. Type III agent 1112 is depicted as being coupled a pair of Type III links 1122 and 1124, enabling processor 1101 to communicate with other platform components (not shown) via Type III links.

The IIO block in SoC processors is configured to perform IO interface operations similar to those performed by an IO chip or chipset in a conventional Northbridge/Southbridge platform architecture. However, rather than have these functions performed by a separate chip or chipset coupled to a processor via an external interconnect, they are now implemented by circuitry and logic embedded on the processor package (i.e., SoC) itself. This supports substantially higher bandwidths than available with conventional external interconnects, among other advantages.

Selected functional blocks are depicted for IIO block 1114 in FIG. 11. These include a Type II agent 1126 including a port 1128 coupled to a Type II link 1130. The IIO block includes a Type I interface 1131 including a Type I agent 1132, and ports 1133, 1134, and 1135. Port 1133 provides an interface to a Type I link 1136. Ports 1134 and 1135 provide Type I link interfaces to Type I links 1138 and 1140, which are respectively connected to ports 1142 and 1144 on system devices 1146 and 1148, which are coupled to system board 1102.

In addition to internal (to SoC 1101) interconnects and SoC-to-platform component links, there may also be high speed serial links between a computer platform and an external device. This will typically be facilitated by an external link host device that is coupled in communication with an external device via an applicable wire or optical cable and port interfaces. In FIG. 11, this is depicted via an external link host device 1150 including a port 1152 coupled to Type I link 1136 and a port 1154 coupled to a port 1156 of an external device 1158 via a high speed serial link cable 1160. External link device 1150 is also mounted on system board 1102.

In general, the components of processor 1101 are interconnected via various types of interconnects, which are depicted as double-headed arrows for convenience. As discussed above, in one embodiment, processor 1101 employs a ring interconnect 1110. Optionally, the processor cores and related components and agents may be connected via an interconnect fabric (e.g., a 2D mesh interconnect). The use of the generic nomenclature Type I, II, and III is to indicate these are different types of links that may typically employ different physical architectures and/or protocols. The various interconnects and links depicted in platform architecture 1100 may comprise point-to-point interconnects (e.g., QPI, PCIe, Intel on-chip System Fabric (IOSF), Open Core Protocol (OCP), Keizer Technology Interconnect®, etc.), as well as buses and other types of interconnect structures, including existing and future interconnect architectures and protocols.

In general, the embedded control channel aspects of the embodiments disclosed herein may be implemented in one or more of the various types of interconnects depicted in platform architecture 1100. For example, in one embodiment component-to-component links (e.g., links depicted on SoC 1101) are configured to employ an embedded control channel using a physical link structure similar to that shown in FIG. 4. Meanwhile, discrete component-to-component links and platform-to-external device links may typically be configured to implement physical link structures employing separate reference clocks, such as shown in FIG. 4a. For discrete component-to-component links, such as Type I links 1136, 1138 and 1140, the physical structure for the links would be implemented via corresponding wiring on system board 1102.

Figure 12:
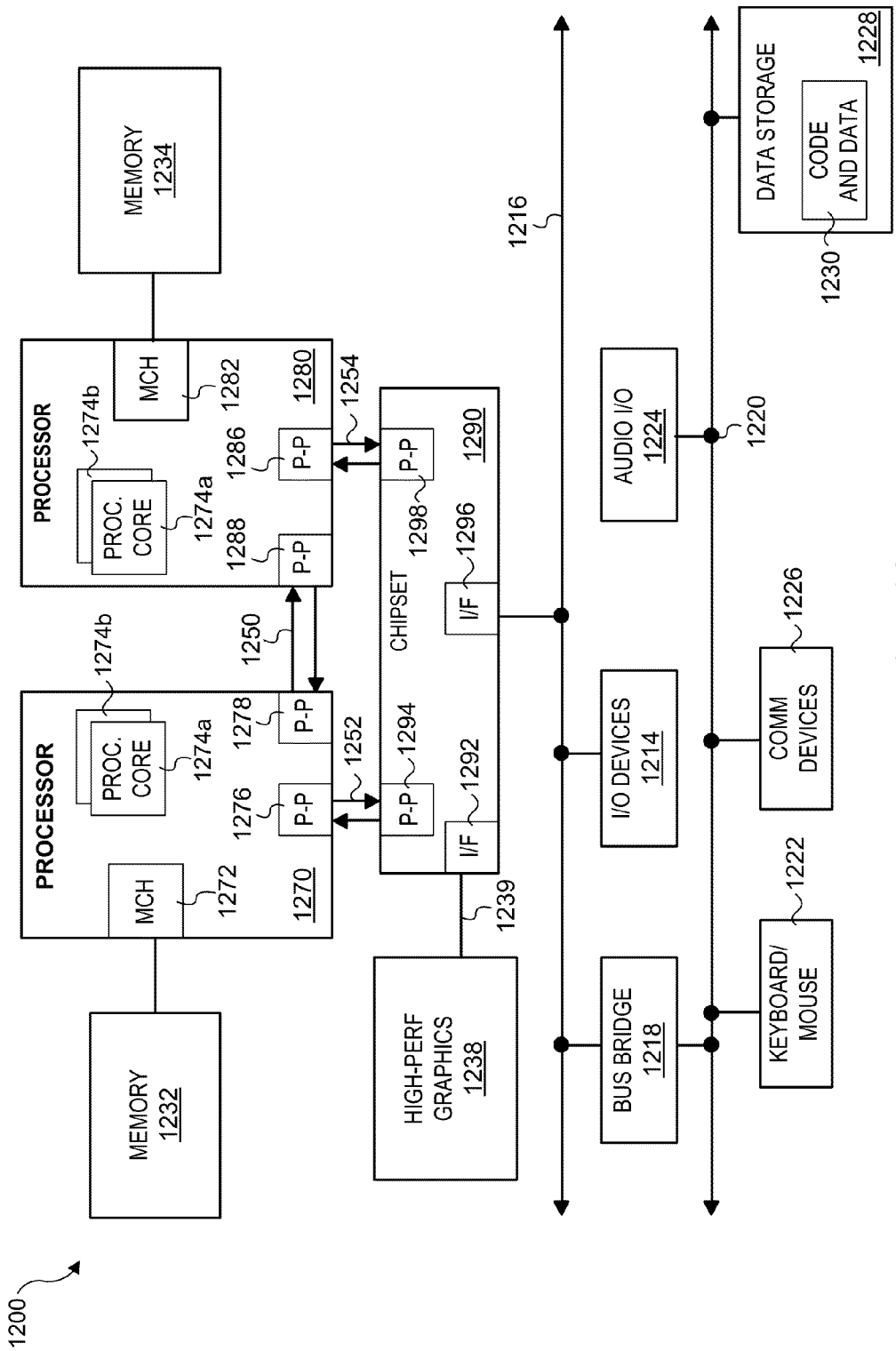
FIG. 12 is a block diagram of an exemplary computer system in which aspects of the embodiments disclosed herein may be implemented.

Embodiments may be implemented in many different system types. For example, FIG. 12 is a block diagram of a multiprocessor system 1200 in which aspects of the embodiments herein may be implemented. As shown in FIG. 12, multiprocessor system 1200 employs a point-to-point interconnect architecture, and includes a first processor 1270 and a second processor 1280 coupled via a point-to-point (P-P) interconnect 1250. Each of processors 1270 and 1280 may comprise multi-core processors, including multiple cores, such as exemplified by the depicted of two processor cores 1274a and 1274b and 1284a and 1284b for first and second processors 1270 and 1280, respectively. Each of the processors can include various hardware and/or logic to enable link operations, as described herein.

Still referring to FIG. 12, first processor 1270 further includes a memory controller hub (MCH) 1272 and P-P interfaces 1276 and 1278. Similarly, second processor 1280 includes a MCH 1282 and P-P interfaces 1286 and 1288. As illustrated, MCH's 1272 and 1282 couple the processors to respective memories, namely a memory 1232 and a memory 1234, which may be comprise portions of system memory (e.g., DRAM) locally attached to the respective processors. First processor 1270 and second processor 1280 may be coupled to a chipset 1290 via P-P interconnects 1252 and 1254, respectively. As shown in FIG. 12, chipset 1290 includes P-P interfaces 1294 and 1298.

Furthermore, chipset 1290 includes an interface (I/F) 1292 to couple chipset 1290 with a high performance graphics engine 1238 via a P-P interconnect 1239. In turn, chipset 1290 may be coupled to a first bus 1216 via an interface 1296. As shown in FIG. 12, various input/output (I/O) devices 1214 may be coupled to first bus 1216, along with a bus bridge 1218 that couples first bus 1216 to a second bus 1220. Various devices may be coupled to second bus 1220 including, for example, a keyboard/mouse 1222, communication devices 1226 and a data storage unit 1228 such as a disk drive or other mass storage device which may include code and data 1230, in one embodiment. Further, an audio I/O 1224 may be coupled to second bus 1220. In addition to the system configurations such as multi-processor system 1200, aspects of embodiments described herein may be incorporated into other types of systems, including mobile devices such as smart cellular telephones, tablet computers, netbooks, ultrabooks or so forth, as well as computer systems including desktop computers, servers, laptops and notebooks.

In addition to the illustrated embodiments, the teaching and principles disclosed herein may be implemented for other configurations. For example, an embedded control channel may be implemented for semiconductor die-to-die interconnects (e.g., for multi-chip modules and System in Package), cable interconnects employing wire or optical cables, backplane interconnects, SoC-to-SoC interconnects, component-to-component interconnects for both components on an IC or SoC or between discrete components on separate IC's, just to name a view possibilities.

The examples of the interconnect configurations and protocols for the illustrated embodiments are also not to be limiting. For example, in addition to QPI links, aspects of embedded control channels may be implemented over Intel® Corporation's recently introduced Keizer Technology Interconnect® (KTI) links, as well as PCIe, IOSF, and OCP interconnects. In addition, embedded control channel aspects may be implemented in very high-speed Ethernet links (e.g., >10 Gigabits per second) that have been recently introduced or proposed that employ multiple lanes and are designed for relatively short links (compared to typical Ethernet usage), such as in blade server backplanes or cable links between servers in server racks.

The embodiments of the embedded control channel techniques disclosed herein provide significant advantages over current approaches for controlling high speed serial links. For example, they alleviate the need for use of separate sideband channels for link control functions, thus reducing both the number of wires (e.g. lanes) used in a link and interfaces to such sideband channels. In addition, such techniques may be implemented in existing physical link architectures to enhance the performance of such links. For example, some existing link protocols may employ limited link control functionality or may have limited usage due to link errors that may be reduced by modifying the existing protocols to facilitate extended link control functionality through use of an embedded control channel in accordance with the teachings herein.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
embedding a control channel in a serial interconnect having a plurality of data lanes, wherein operational aspects of the interconnect are controlled via use of control channel data that is sent over one or more of the data lanes on a periodic basis having a nominal periodicity and implementing a link state cycle employed for transmitting control information and non-control information over the interconnect, the link state cycle including a first period comprising a link control period during which link control information may be transmitted over the one or more lanes, the first period having a starting time that is implemented at a nominal periodicity.

2. The method of claim 1, further comprising dynamically adjusting a length of the link control period.

3. The method of claim 1, further comprising dynamically adjusting a length of the link state cycle.

4. The method of claim 1, further comprising transmitting a monitor pattern during a link control period.

5. The method of claim 1, further comprising: implementing separate reference clocks at the transmitting port and the receiving port, the separate reference clocks operating at non-identical frequencies; and transmitting control information over the control channel to align the transmitting port and receiving port link state cycles.

6. The method of claim 5, further comprising:
implementing an initial stagger between the transmitting port and receiving port link state cycles such that the link state cycles have an initial alignment;
transferring data from the transmitting port to the receiving port over a plurality of link state cycles, resulting in a misalignment between the transmitting port and receiving port link state cycles; and
altering at least one of the transmitting port and receiving port link state cycles so as to realign the link state cycles in accordance with the initial alignment.

7. The method of claim 6, further comprising:
determining a clock drift rate between the separate reference clocks; and
based on the clock drift rate, implementing a periodic realignment of the transmitting port and receiving port link state cycles.

8. The method of claim 1, wherein the serial interconnect comprises a multi-lane link employing a plurality of data traffic lanes, and embedding the control channel in the serial interconnect comprises sending control information over one or more of the data traffic lanes using a periodic link control cycle.

9. The method of claim 1, further comprising employing the control channel to effect changes in a power state of the link.

10. The method of claim 1, further comprising employing the control channel to reset the link.

11. The method of claim 1, further comprising transmitting multi-bit link control information between a transmitting port and a receiving port by transmitting a plurality of bits over respective lanes during a single unit interval.

12. The method of claim 1, further comprising transmitting identical link control information comprising a bit pattern of one or more bits over a plurality of respective lanes;
determining a most common form of the bit pattern received at the receiving port; and
implementing a link control operation based on the most common form of the bit pattern that is determined.

13. The method of claim 1, further comprising implementing respective first and second link state cycles at a first transmitting port and a first receiving port, wherein the link state cycle at the first receiving port is staggered relative to the link state cycle at the first transmitting port.

14. The method of claim 13, further comprising dynamically determining a stagger between the first transmitting port and the first receiving port link state cycles.

15. The method of claim 13, wherein the method is implemented for an interconnect link between a first component and a second component, wherein the first transmitting port is associated with the first component and the first receiving port is associated with the second component, and wherein the first and second link state cycles are associated with a first transmission path over the interconnect link from the first component to the second component, the method further comprising:
- implementing a second transmission path over the interconnect link from the second component to the first component; and
- implementing respective third and fourth link state cycles at the second transmitting port and the second receiving port, wherein the link state cycle at the second receiving port is staggered relative to the link state cycle at the second transmitting port.

16. The method of claim 15, wherein, for a given link state cycle, the second and third link state cycles have a start point relative in time to a start point of the first link state cycle such that the third link state cycle start point is a function of to the second link state cycle start point.

17. The method of claim 15, wherein a timing of a link state cycle corresponding to the first transmission path and the second transmission path is configured to facilitate a request/response link control protocol.

18. The method of claim 1, further comprising:
- transmitting data over the link in a scrambled form; and
- unscrambling a portion of the data to extract link control information.

19. The method of claim 1, wherein the control channel does not employ a protocol used to distinguish control channel data from non-control channel data.

20. The method of claim 1, wherein the high speed serial interconnect comprises an interconnect between two components on a common integrated circuit.

21. The method of claim 1, wherein the high speed serial interconnect comprises an interconnect between two discrete components within a computer platform.

22. The method of claim 1, wherein the high speed serial interconnect comprises an interconnect between a computer platform and device external to the platform.

23. An apparatus, comprising: a first component and a second component coupled in communication via a serial interconnect having a plurality of lanes, each of the first and second components having embedded logic configured to facilitate an embedded control channel in a protocol used to transfer information between the first and second components via the serial interconnect, wherein operational aspects of the interconnect are controlled via use of control channel data that is sent over one or more of the data lanes on a periodic basis having a nominal periodicity, wherein the embedded logic is further configured to implement a link state cycle employed for transmitting control information and non-control information over the interconnect, the link state cycle including a first period comprising a link control period during which link control information may be transmitted over the one or more lanes, the first period having a starting time that is implemented at a nominal periodicity.

24. The apparatus of claim 23, wherein the apparatus comprises an integrated circuit.

25. The apparatus of claim 23, wherein the apparatus comprises a main board of a computer platform including a processor having a first port coupled to a second port of a peripheral device via the serial interconnect.

26. The apparatus of claim 23, wherein the first and second components include respective reference clocks operating at non-identical frequencies, and the embedded logic is further configured to implement respective link state cycles for each of a first and second components and transmit control information over the control channel to align the first and second component link state cycles.

27. The apparatus of claim 23, wherein the first and second components include respective reference clocks operating at non-identical frequencies, and the embedded logic is further configured to implement respective link state cycles for each of a first and second components and transmit control information over the control channel to align the first and second component link state cycles.

28. A system, comprising:
- a plurality of components, interconnected via a plurality of interconnects, including a first component and a second component coupled in communication via a serial interconnect having a plurality of lanes, each of the first and second components having embedded logic configured to facilitate an embedded control channel in a protocol used to transfer information between the first and second components via the serial interconnect, the embedded control channel implementing a link state cycle employed for transmitting control information and non-control information over the serial interconnect, the link state cycle including a first period comprising a link control period during which link control information may be transmitted over the one or more lanes, the first period having a starting time that is implemented at a nominal periodicity.

29. The system of claim 28, wherein the first and second components comprise semiconductor dies, and the system comprises one of a multi-chip module or system in a package.

30. The system of claim 28, wherein the system comprises a System on a Chip.

31. The system of claim 28, wherein the serial interconnect comprises one of a Quick Path Interconnect (QPI), a Peripheral Component Interconnect Express (PCIe), an Intel on-chip System Fabric interconnect, an Open Core Protocol link, a Keizer Technology Interconnect link, or a multi-lane Ethernet link.

* * * * *